(12) United States Patent
Choi et al.

(10) Patent No.: US 6,868,416 B2
(45) Date of Patent: Mar. 15, 2005

(54) INTERNET ADDRESSING ARCHITECTURE AND HIERARCHICAL ROUTING METHOD THEREOF

(75) Inventors: Hyun Gi Choi, Daejeon-shi (KR); Gyung Pyo Hong, Daejeon-shi (KR); Sang Beom Kim, Daejeon-shi (KR); Sang Eon Kim, Daejeon-shi (KR); Seong Jong Bong, Daejeon-shi (KR)

(73) Assignee: Korea Telecommunication Authority, Kyunggi-Di (KR)

( * ) Notice: Subject to any disclaimer, the term of this patent is extended or adjusted under 35 U.S.C. 154(b) by 427 days.

(21) Appl. No.: 09/729,651

(22) Filed: Dec. 4, 2000

(65) Prior Publication Data

US 2002/0136387 A1 Sep. 26, 2002

(30) Foreign Application Priority Data

Dec. 3, 1999 (KR) .......................................... 1999-54912
Jul. 14, 2000 (KR) .......................................... 2000-40669

(51) Int. Cl.$^7$ ............................................. G06F 17/30
(52) U.S. Cl. .............................. 707/10; 707/1; 709/217
(58) Field of Search ................................ 379/120, 900; 707/1, 10; 340/825.21; 711/108; 370/352; 709/217

(56) References Cited

U.S. PATENT DOCUMENTS 5,185,785 A * 2/1993 Funk et al. ................. 379/120
5,806,057 A * 9/1998 Gormley et al. ............... 707/1
5,872,518 A * 2/1999 Kushita .................. 340/825.21
5,930,474 A * 7/1999 Dunworth et al. ............ 707/10
6,266,405 B1 * 7/2001 Madour et al. ............. 379/900
6,289,414 B1 * 9/2001 Feldmeier et al. .......... 711/108
6,311,186 B1 * 10/2001 McLampy et al. ........... 707/10
6,385,193 B1 * 5/2002 Civanlar et al. ............ 370/352

FOREIGN PATENT DOCUMENTS

JP          8-163173          6/1996
JP          11-41293          2/1999

* cited by examiner

Primary Examiner—Charles Rones
Assistant Examiner—Hassan Mahmoudi
(74) Attorney, Agent, or Firm—Merchant & Gould P.C.

(57) ABSTRACT

An internet address system formed by introducing a E.164 number system of the ITU-T or a zip code system to IPv6 address system, and a hierarchical routing method using the same. Thus, a user can easily find an IPv6 address of a user terminal from his/her telephone number. The telephone numbers can be well linked to the IPv6 addresses, so that an internet provider can easily design and assign the IPv6 addresses. In addition, a hierarchical routing process is carried out by using the E.164 number system, thereby reducing routing time and improving a routing speed. The subscriber address can also be found out by the internet address of the subscriber. The IPv6 addresses and zip codes are well linked by applying the zip codes of the respective countries to the IPv6 address system, thereby efficiently using the information for network management and administration.

4 Claims, 6 Drawing Sheets

INTERNET ADDRESSING ARCHITECTURE AND HIERARCHICAL ROUTING METHOD THEREOF

BACKGROUND OF THE INVENTION

1. Field of the Invention

The present invention relates to a structure for applying a specific number system to an internet address system, and a hierarchical routing method using the same, and in particular to reformation of IPv6 address system by introducing E.164 number system of the ITU-T or a zip code system to IPv6 address system, when using IPv6 addresses in a public internet network, and a hierarchical routing method using the same.

2. Description of the Background Art

The public internet network distinguishes computers or related devices connected to the internet, by using an IPv4 address system. The computers or devices have their unique public IPv4 addresses. However, the 32 bit public IPv4 addresses are getting deficient due to the enormously increased number of internet users. In order to solve this problem, an IPv6 address system has been suggested. Thus, the internet users are provided with the IPv6 addresses supporting 128 bits.

In the IPv6 address system, some of the 128 bits are used as a top level aggregation identifier(hereinafter, referred to as 'TLA ID'), and the other bits are utilized by an internet provider having the IPv6 address according to an address assignment plan.

On the other hand, E.164 number system of the ITU-T has been applied to the international telephone network as well as to the Korean telephone network. Thus, the telephone numbers are internationally unique like the IP addresses.

The respective number system will now be described with reference to the accompanying drawings.

FIG. 1 is a structure diagram illustrating a general E.164 number system of the ITU-T. Here, fifteen digit decimal numbers are used in the E.164 number system. In Korea, the first three digit numbers represent country code 1, and the rest twelve digits identify domestic telephone numbers. In the domestic telephone numbers, the first four digits represent area code 2, the next four digits represent central office code 3, and the last four digits represent station number 4.

An ATM end system address(AESA) employed in a private ATM network is an address system having a structure using E.164 number system. The AESA is classified into three types of address systems, one of which having the structure based on the E-164 system.

FIG. 2 is a structure diagram illustrating a structure using the E.164 number system in general AESA.

In this structure, the addresses consist of twenty bytes in total. The first thirteen bytes constitutes a network prefix 5, and the last seven bytes constitutes a user part 6.

As described above, the E.164 number system is used in the network prefix of 13 bytes. Accordingly, the public ATM network can communicate with the private ATM network, by analyzing E.164 numbers.

FIG. 3 is a structure diagram illustrating a general 128 bit IPv6 address system. In the 128 bit IPv6 address system, some of the 128 bits are used as the TLA ID 7, and the other 8 is employed as a next level aggregation identifier(NLA ID), that is, a site level aggregation identifier(SLA ID) and an interface identifier. The internet provider having the IPv6 address uses the NLA ID, SLA ID and interface ID according to the address assignment plan.

FIG. 4 is a structure diagram illustrating a conventional zip code system. The zip code system 9 includes a high level area code field 91 representing high level areas in administrative districts, a middle level area code field 92 representing middle level areas, and a low level area code field 93 representing low level areas. The zip code systems are slightly different depending on countries worldwide, but they are modified within the scope of the above-described structure.

Zip codes are assigned to each country in consideration of their own administrative districts and local characteristics. Therefore, the zip code is as unique as the internet address, and systematically organized.

FIG. 5 is a structure diagram illustrating a conventional zip code system in Korea. The Korean zip code system includes a special municipality/megalopolis/province code field 911, an area number code field 912, a municipality/district/county code field 921 and a town/township/village/building code field 931.

Here, the special municipality/megalopolis/province code field 911 and the area number code field 912 belong to the high level area code field 91, the municipality/district/county code field 921 belongs to the middle level area code field 92, and the town/township/village/building code field 931 belongs to the low level area code field 93.

On the other hand, as mentioned above, the IPv4 addresses are getting deficient due to the enormously increased number of the internet users. Although the IPv6 address system was suggested as the second best, the IPv6 addresses has again become depleted.

As a result, there is a growing demand for a method to easily generate IP addresses, instead of introducing a new address system.

SUMMARY OF THE INVENTION

Accordingly, an object of the present invention is to provide an internet address system which can be easily linked to a general telephone network number system, by introducing E.164 number system of the ITU-T and a zip code system to IPv6 addresses, when using IPv6 address system in a public internet network, and a hierarchical routing method using the E.164 number system and the zip code system.

In order to achieve the above-described object of the present invention, there is provided an internet address system including: a top level aggregation identifier field and a telephone number code field classified according to a telephone number system.

There is also provided a hierarchical routing method using an internet address system introducing a telephone network number system, wherein a routing process is performed in the internet address system, by using the telephone number system consisting of hierarchical administrative district codes, the hierarchical routing process being integrated or segmented according to the respective steps of the telephone number system in countries worldwide.

In addition, there is provided an internet address system, including: a top level aggregation identifier field; a zip code field classified by a zip code system; and a subscriber identification number field which is a final identifier field.

Moreover, there is provided a hierarchical routing method using an internet address system introducing a zip code system, wherein a routing process is performed in the internet address system, by using the zip code system consisting of hierarchical administrative district codes, the hierarchical routing process being integrated or segmented according to the respective steps of the zip code system in countries worldwide.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

An internet address system and a hierarchical routing method using the same in accordance with the present invention will now be described in detail with reference to the accompanying drawings.

Figure 1:
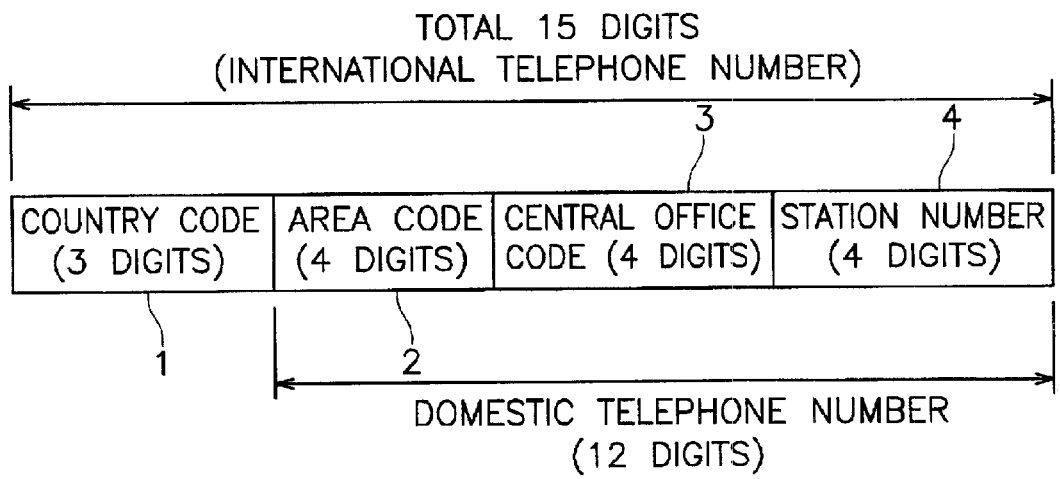
FIG. 1 is a structure diagram illustrating a conventional E.164 number system of the ITU-T.
Figure 2:
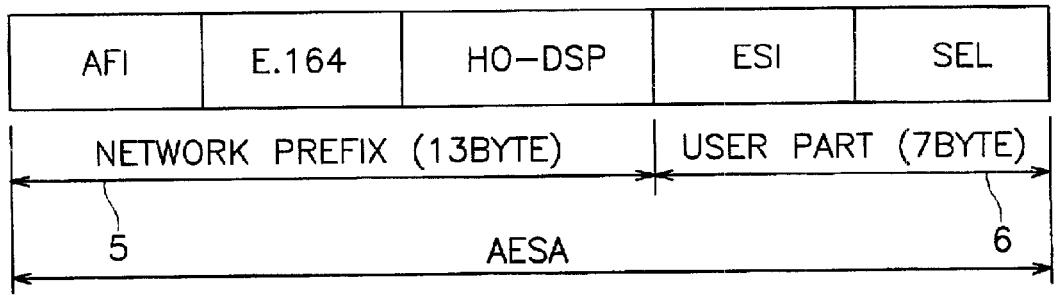
FIG. 2 is a structure diagram illustrating a conventional AESA using the E.164 number system.
Figure 3:
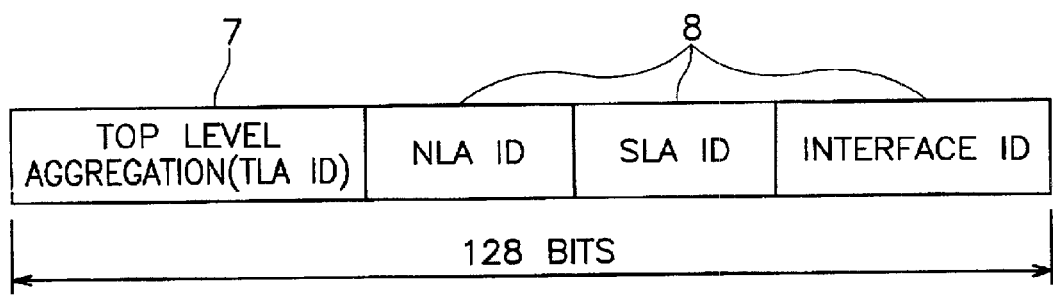
FIG. 3 is a structure diagram illustrating a conventional IPv6 address system.
Figure 4:
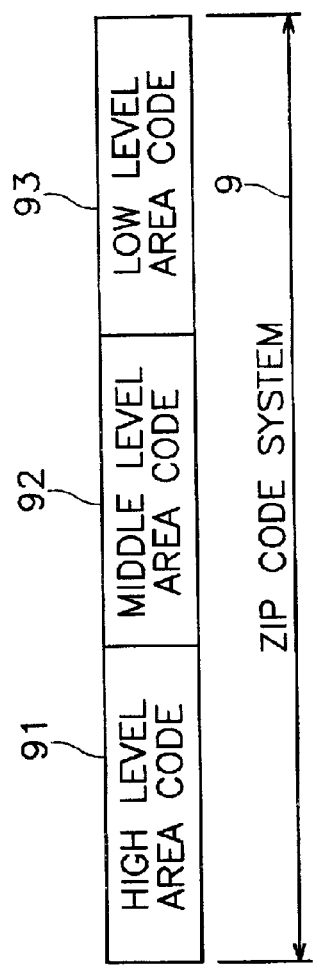
FIG. 4 is a structure diagram illustrating a conventional zip code system.
Figure 5:
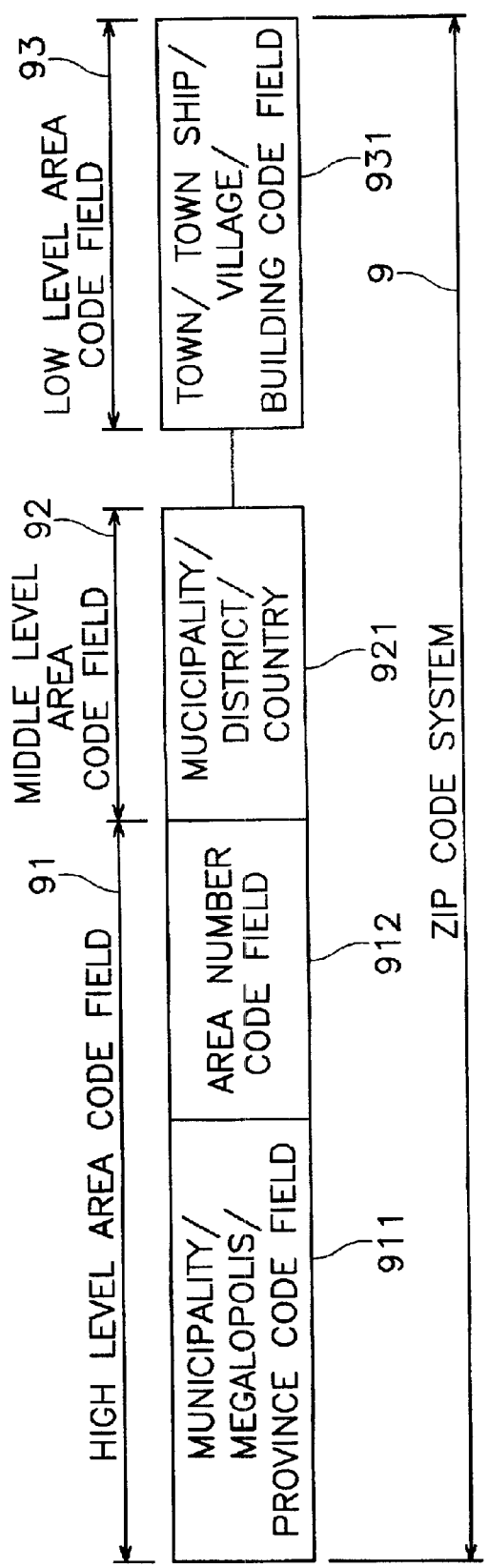
FIG. 5 is a structure diagram illustrating a conventional zip code system in Korea.
Figure 6:
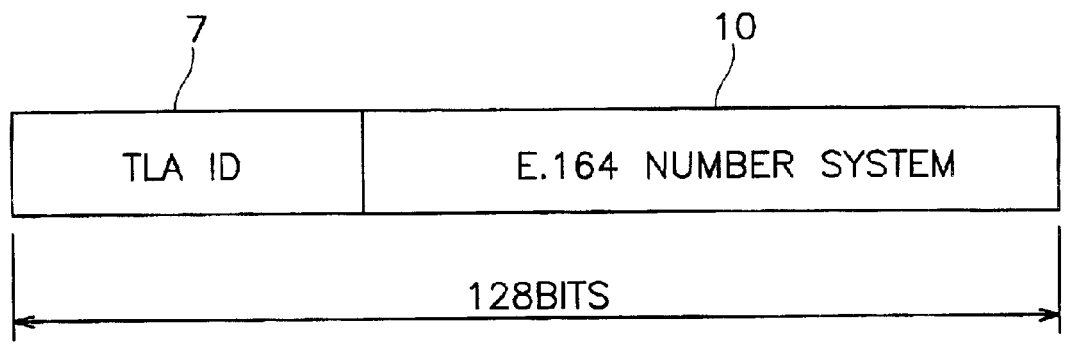
FIG. 6 illustrates a structure diagram of introducing ITU-T E.164 number system to an IPv6 address system in accordance with a first embodiment of the present invention.

FIG. 6 illustrates a structure of introducing ITU-T E.164 number system to an IPv6 address system in accordance with a first embodiment of the present invention. In the 128 bit address system, the ITU-T E.164 number system 10 is applied to the bits except for a TLA ID 7.

The ITU-T E.164 number system 10 consists of fifteen digit decimal numbers. When the decimal numbers are converted into binary numbers to be included in an address space except for the TLA ID 7.

Figure 7:
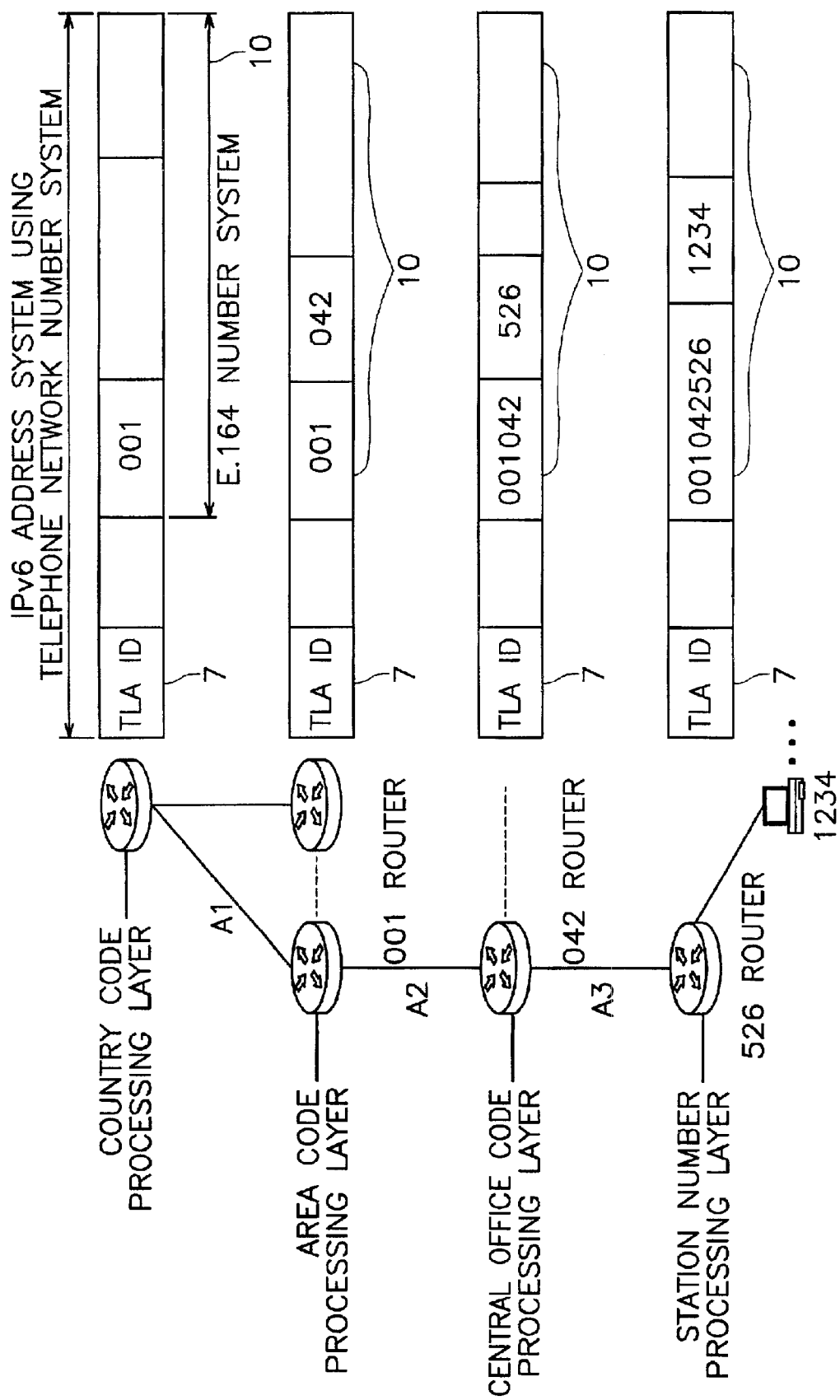
FIG. 7 is a flowchart showing a hierarchical routing method using the E.164 number system where a routing process is performed in the number system in accordance with the first embodiment of the present invention.

FIG. 7 is a flowchart showing a hierarchical routing method using the E.164 number system where a routing process is performed in the above-described structure. Firstly, a router of a country code hierarchy detects a country code, and is forwarded to a corresponding country(A1). A router of a domestic area code hierarchy identifies a domestic area code, and forwards it to a corresponding area(A2). Similarly, a router of a telephone number code hierarchy identifies a destination identical to a corresponding central office code(A3).

Figure 8:
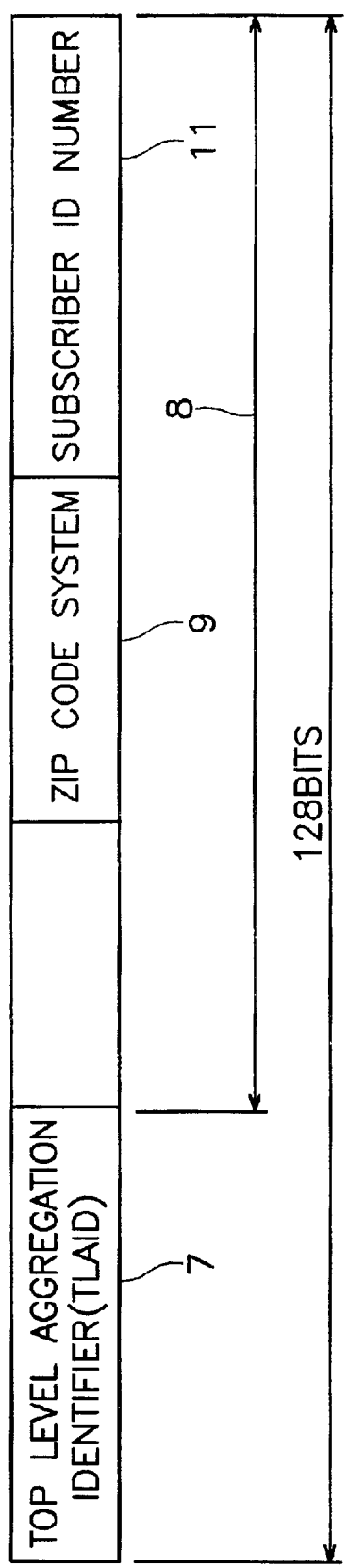
FIG. 8 illustrates a structure diagram of introducing a zip code system to the IPv6 address system in accordance with a second embodiment of the present invention.

FIG. 8 illustrates a structure of introducing a zip code system to the IPv6 address system in accordance with a second embodiment of the present invention. An internet provider can employ the portion 8 of the 128 bits excluding the portion used by the TLA ID 7 according to an address assignment plan. Here, the address assignment plan portion 8 is partially used as the zip code system 9 and a subscriber ID number 11 representing a final destination.

Figure 9:
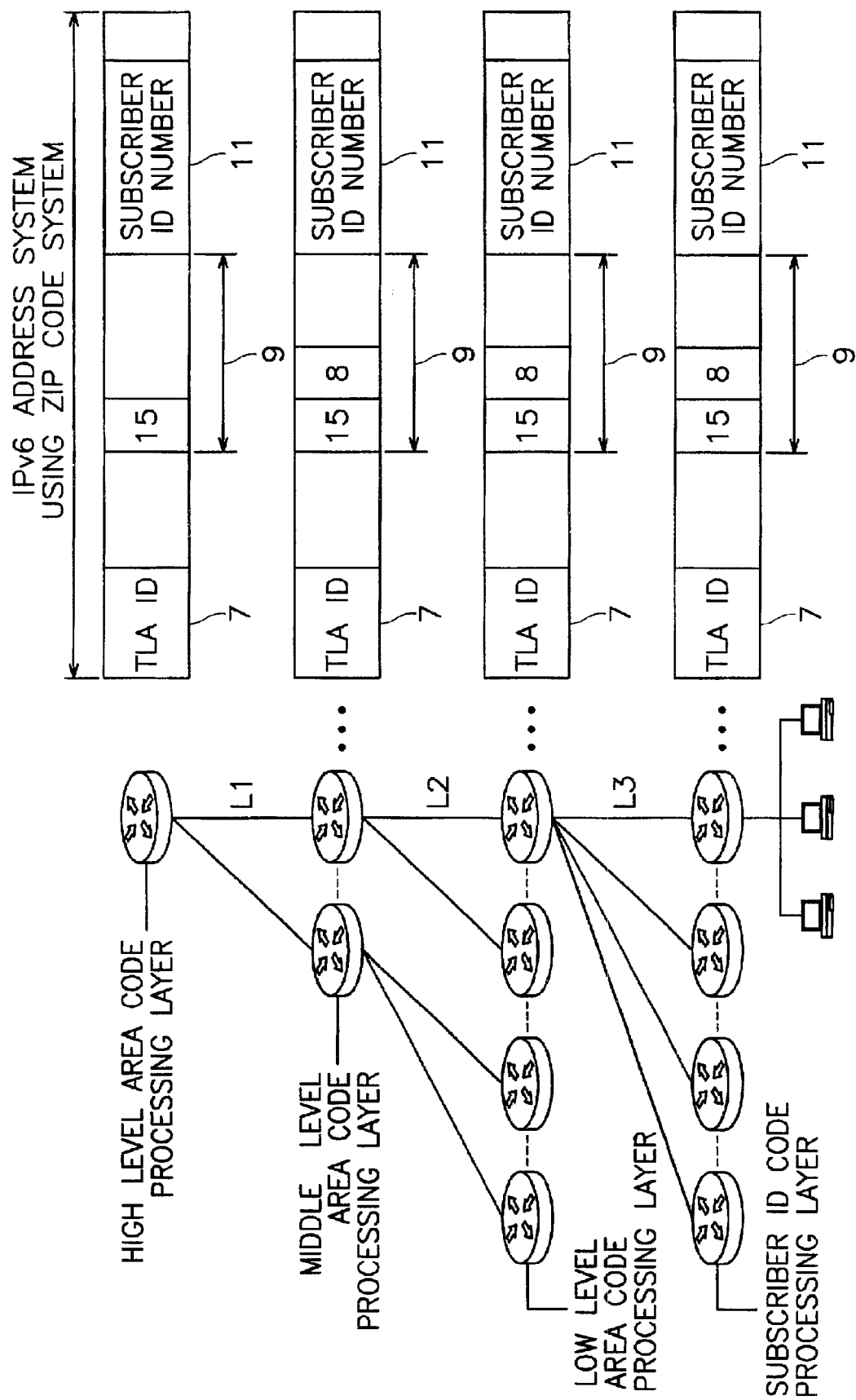
FIG. 9 is a flowchart showing a hierarchical routing method using the zip code system where the routing process is performed in the address system in accordance with the second embodiment of the present invention.

FIG. 9 is a flowchart showing a hierarchical routing method using the zip code system where the routing process is performed in the above-described structure.

The routing process is performed according to the structure of the zip code system 9 consisting of hierarchical steps on the basis of local properties.

In the hierarchical routing process, a router of a high level area code hierarchy identifies a high level area code in the high level area code field 91 of the zip code system 9, and forwards the high level area code to the corresponding high level area(L1). A router of a middle level area code hierarchy identifies a middle level area code in the middle level area code field 92 of the zip code system 9, and forwards the middle level area code to the corresponding middle level area(L2).

A router of a low level area code hierarchy identifies a low level area code in the low level area code field 93 of the zip code system 9, and forwards the low level area code to the corresponding low level area(L3). A router of a subscriber ID number hierarchy identifies the subscriber ID number 11, and routes the subscriber ID number to a destination identical to the subscriber ID number.

In addition, in accordance with the present invention, the respective country numbers may be added according to the currently-used zip code system.

In the hierarchical routing process, a router of a country code hierarchy can detect a country code and forward the country code to a corresponding country, by adding the country codes to the IPv6 address system introducing the zip code system.

As discussed earlier, the E.164 number system is introduced to the IPv6 address system, and thus the user can easily find out the IPv6 address of the terminal by using his/her telephone number. It is also possible to assign the IPv6 addresses relating to about twenty million telephone numbers in Korea by introducing current E.164 number system to IPv6 address system. Thus, the telephone numbers are well linked to the IPv6 addresses, so that the internet provider can easily design and assign the IPv6 addresses. In addition, the hierarchical routing process is carried out by using the E.164 number system, thereby reducing the routing time and improving the routing speed.

Moreover, internet address system employing the zip code system which is introduced to the IPv6 address system is used, and thus making it easier to find out the internet address of the user terminal by the subscriber address. Conversely, the subscriber address can be easily found using the internet address of the subscriber. The IPv6 addresses and zip codes are well linked by applying the zip codes of the respective countries to the IPv6 address system, thereby efficiently using the network information for network management and administration. Furthermore, the hierarchical routing method is provided in the routing process of the above-described structure, which improves routing efficiency.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A hierarchical routing method using an internet address system introducing a zip code system, wherein a routing process is performed in the internet address system, by using the zip code system consisting of hierarchical administrative district codes, the hierarchical routing process being integrated or segmented according to the respective steps of the zip code system in countries worldwide, the hierarchical routing process further comprising:

a first step wherein a router of a high level area code hierarchy identifies a high level area code in the zip code system, and forwards to a corresponding high level area;

a second step wherein a router of a middle level area code hierarchy identifies a middle level area code in the zip code system, and forwards to a corresponding middle level area;

a third step wherein a router of a low level area code hierarchy identifies a low level area code in the zip code system, and forwards to a corresponding low level area; and a fourth step wherein a router of a subscriber ID number hierarchy identifies a subscriber ID number, and routes to a destination identical to the subscriber ID number.

2. The method according to claim 1, wherein the hierarchical routing process further comprises a step wherein a router of a country code hierarchy identifies a country code, and forwards to a corresponding country prior to the first step.

3. The method according to claim 1, wherein IPv6 address system is used as the internet address system, and the zip code systems of the respective countries are used as the zip code system.

4. The method according to claim 1, wherein the internet address system includes a top level aggregation identifier field.

* * * * *